Feb. 3, 1942.　　E. DORNHÖFER ET AL　　2,271,583
CONTROLLING DEVICE FOR MACHINE TOOLS
Filed April 2, 1940
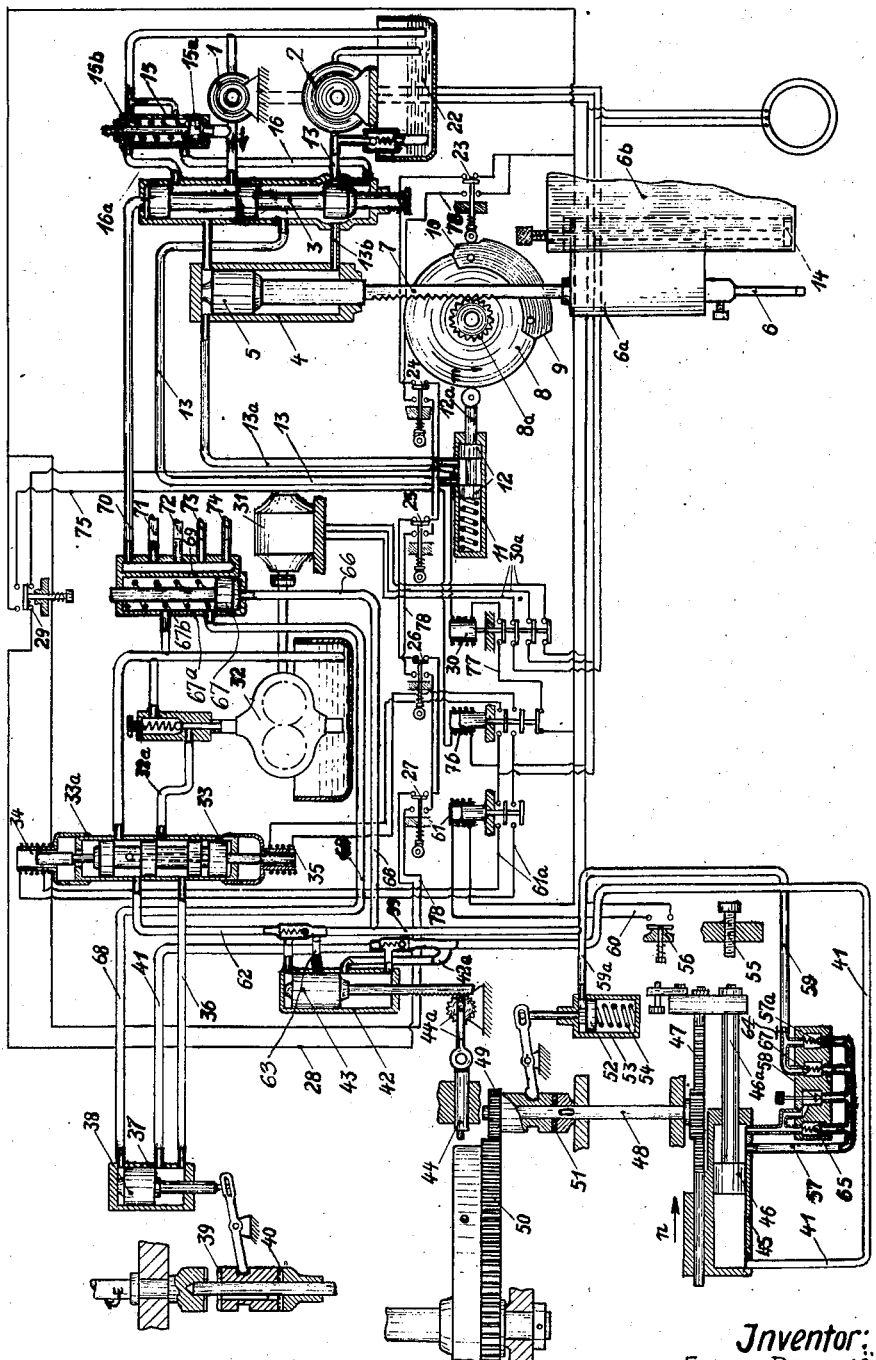
Inventor:
EWALD DORNHÖFER
ROBERT OBTRESAL
By:
Richards & Geier
Attorneys Patented Feb. 3, 1942

2,271,583

UNITED STATES PATENT OFFICE 2,271,583

CONTROLLING DEVICE FOR MACHINE TOOLS

Ewald Dornhöfer and Robert Obtresal, Magdeburg, Germany, assignors to Magdeburger Werkzeug Machinenfabrik G. m. b. H., Magdeburg, Germany, a corporation of Germany Application April 2, 1940, Serial No. 327,468
In Germany February 6, 1939

13 Claims. (Cl. 29—38)

This invention relates to a controlling device for machine tools and refers more particularly to a device for automatically operating revolving tools which engage work pieces one after the other.

The invention is particularly concerned with machine tools of the type wherein a number of tools movable in the direction of their feed, such as turning tools, carry out the same operation, one after the other, upon any desired large number of work pieces.

Each work piece is moved stepwise from one tool to the next one after the operation of the first tool has been completed. It is customary to provide machine tools of this type with a prismatic carrier or support having for instance, six side surfaces, more or less, and to provide lathes or rotary planers with vertical rotary axes close to five of these surfaces, while close to the last surface of the support there are means for removing the work pieces and for affixing them to their carriers. These means are usually carried by a rotary work piece table provided with six attachments for the work pieces.

Machines of this type must carry out complicated interrelated movements. Each of the machine tools carries out a feed movement and a return movement at different speeds, while the work piece is rotated in the manner customary when operating with rotary planers.

The table carrying the work pieces must carry out a stepwise turning movement and the operations of certain auxiliary devices, such as couplings, locking means, and brakes, depend upon this stepwise movement.

All these operations must be brought into conformity with each other and must conform to the general development of the work.

It was found that the large number of operations and the necessity to correlate them make it very difficult to provide purely mechanical means for controlling purposes and that such mechanical means are apt to become very complicated in their construction and difficult to operate, with the result that their construction, their adjustment, the exactness of their work and their supervision by operators become very difficult and expensive.

An object of the present invention is to simplify the construction and the operation of controlling means for machine tools of the described type, to facilitate the supervision of these means, to increase their reliability and, in general, to provide a machine, the operation of which will be more exact and dependable.

Another object is the provision of fluid-operated controlling means and electrically operated switching devices for the purpose of operating machine tools of the described type, the hydraulic and electrical means being so arranged and located in relation to the machine that they will facilitate the various operations of the latter.

Other objects of the present invention will become apparent from the following specification.

The objects of the present invention may be realized through the provision of pressure actuated or hydraulic means which are used to drive and control the tools and the rotary work piece support. Electrical switching means are combined with the hydraulic means and are used to create the interdependence of the movements of the tools and the work piece support.

In accordance with the present invention, the hydraulic means and the electrical switching devices are so distributed in the machine that they do not interfere with the operation of the machine and facilitate the supervision by an operator.

The invention will appear more clearly from the following detailed description when taken in connection with the accompanying drawing, showing by way of example, a preferred embodiment of the inventive idea.

The drawing shows a diagram illustrating the connections of the steering means of a machine tool.

The drawing shows a tool 6, carried by a tool support 6a, which is slidably mounted in a side surface of the tool table 6b. Only a portion of the tool table 6b is illustrated in the diagram.

In the described embodiment, the tool table is assumed to be provided with six side surfaces, five of which carry separate tool holders 6a. The tool table 6b carries six tool clamping devices (not shown) and is turned stepwise in the course of its operation, each movement turning the table to an extent of 60°.

The controlling and actuating means are substantially the same for each of the five tools and tool holders. For simplicity's sake, only one tool holder 6a and the device actuating the same are illustrated in the drawing.

The tool holder 6a, is slidable up and down along the side surface of the tool table 6b, and is driven by hydraulic or pressure actuated means, preferably pressure oil.

The device actuating the tool holder 6a, comprises a cylinder 4, enclosing a piston 5, which is movable up and down within the cylinder. The piston 5 is provided with a downwardly extending narrower portion which is firmly connected with the upper end of a rack 7. The lower end of the rack 7 is firmly connected with the tool holder 6a, so that the tool holder, the rack 7 and the piston 5 move as a single unit.

Two pumps 1 and 2 are situated close to the cylinder 4. The pump 1 may be operatively connected with the pump 2, and the two pumps may receive oil from a container 22.

A controlling valve 3 is situated between the pumps 1 and 2, and the cylinder 4. The valve 3 consists of a cylinder containing a valve body which is moved within the cylinder by the pressure of the fluid and which consists substantially of three pistons fitting within the cylinder and interconnected by narrower portions.

The purpose of the valve 3 is to transmit the pressure fluid to the cylinder 4 to cause the tool holder 6a to move rapidly downwards until the tool 6 is brought into engagement with the work piece, thereupon to cause the tool holder 6a to carry out a downwardly directed feed movement with a regulatable speed and after its completion to move the tool holder quickly back again.

The pipes interconnecting the pumps 1 and 2, the valve 3 and the cylinder 4, comprise a pipe 13, connecting the pump 2 with a lower portion of the valve 3. Another pipe 13b connects the lower portion of the valve 3 with the lower end of the cylinder 4.

The two pipes 13 and 13b, lead to a portion of the valve casing which is of a greater diameter than the valve body movable within the casing, so that the fluid under pressure can usually flow from the pump 2 through the pipe 13, the casing of the valve 3, and the pipe 13b, into the cylinder 4.

The middle portion of the valve casing is connected by a pipe with the pump 1. This latter pipe is connected with a safety device comprising a cylinder 15, and a piston 15a, which is movable within the cylinder 15 and which is subjected to the pressure of a spring 15b.

In the position shown in the drawing, fluid under pressure flows freely from the pump 1 to the middle portion of the valve 3.

If, however, pressure within this pipe is increased to a certain extent, then this pressure will raise the piston 15a, compress the spring 15b and establish, at the same time, a connection between the pump 1 and the upper end of a pipe 16, the lower end of which leads to the lower end of the valve 3.

A pipe 16a connects the upper end of the cylinder 15 with the upper portion of the valve 3. The oil situated within the container 22 is connected with the pump 1 by another pipe, which also leads to the cylinder 15, and which is provided with a by-pass.

Another pipe connects the upper portion of the valve 3 with the upper end of the cylinder 4. This upper end of the cylinder 4 is also connected by the pipe 13a with the casing of a controlling valve 11. This casing is also in communication with one end of the pipe 13, the opposite end of which leads to the middle portion of the valve 3.

The rack 7 meshes with a gear wheel 8a which is firmly connected and rotatable along with a cam or steering disc 8. The disc 8 carries abutments or cam surfaces 9 and 10, situated at predetermined points of its periphery.

A rod 12a has an end which is always in engagement with the periphery of the cam disc 8, and the opposite end of the rod constitutes a single unit with two pistons 12 serving as a valve body for the steering valve 11.

The rod 12a is pressed against the disc 8 by a spring situated within the casing of the valve 11, and engaging one of the pistons 12.

The cam disc 8 is also used to actuate an electrical switch 23, which includes a spring actuated rod pressed against the periphery of the disc 8. The switch 23 is used to actuate the tool 6 in a manner which will be described in detail hereinafter.

The other four tools and tool holders are operated by similar switches 24, 25, 26, and 27.

All of these switches are connected in series with each other and are included in the conduit 28, which consequently, will conduct electricity only when the last of these switches is switched on.

A switch or contact 29 is also included in the conduit 28. When the contact 29 is in the illustrated position and when the switches 23 to 27 are closed, an electric current will flow through the conduit 28 and will energize the solenoid of a relay 30. The force of attraction exerted upon the movable element of the relay 30 will move it into the illustrated position in which the three conduits 30a are energized.

The conduits 30a lead to a motor 31, the shaft of which is firmly connected with a pump 32, used to operate the pressure transmitting medium. As shown in the diagram, the pump 32 is in communication with its own source of pressure operating medium, such as oil.

As will be described in detail hereinafter, oil transmitted by the pump 32 is used to turn the table 50, a portion of which is illustrated diagrammatically in the drawing and which carries the six attachments for the work pieces.

The pump 32 is connected by a pipe 32a with a controlling valve 33, comprising a casing 33a and four interconnected pistons which are movable within the casing. These pistons are operated by two electro-magnets 34 and 35. The magnet 34 is located at the upper end of the valve 33, while the magnet 35 is situated at the opposite lower end of the valve 33.

The middle portion of the valve 33 is connected by a pipe 36, with the lower end of a cylinder 37, containing a piston 38. The piston 38 is firmly connected with a piston rod which projects outside of the cylinder 37 and which is pivotally connected with one end of a double armed lever.

The opposite end of this lever is connected with a member 39, constituting a part of a coupling which is not shown in further detail in the drawing, and which is used to rotate the work pieces.

The member 39 is also connected with a brake 40 which is illustrated diagrammatically in the drawing and which is used to stop quickly the rotary movement of the work piece drive.

A pipe 41 connects the middle portion of the cylinder 37 with a cylinder 42. A ball valve is interposed between the pipe 41 and the cylinder 42. A piston 43 is movable within the cylinder 42, and is provided with a rack which is situated outside of the cylinder 42. This rack meshes with a gear wheel which is connected with a crank drive 44a. The drive 44a is used to operate a bolt 44 which serves the purpose of locking the rotary table 50.

As shown in the drawing, the free end of the bolt 44 may be inserted into a bore hole formed upon a side surface of the table 50, thereby locking the table in a predetermined position.

A pipe 42a connects directly the middle portion of the cylinder 42 with the pipe 41. The pipe 41 leads to a horizontally disposed cylinder 45 which contains the piston 46. This device is used for driving the rotary table 50. Oil flowing into the cylinder 45 moves the piston 46 in the direction of the arrow $n$.

The piston 46 is connected by the piston rod 46a and a transverse connecting member with a rack 47, which meshes with a gear wheel firmly connected with a shaft 48. The opposite end of the shaft 48, is firmly connected with a gear wheel 49, meshing with a toothed crown which is firmly connected with the table 50. Thus, the movement of the piston 46 is transformed into a rotation of the table 50.

The shaft 48 also carries a coupling 51, the movable element of which is engaged by one end of a two armed lever. The opposite end of this lever is pivotally connected with the piston rod of a piston 52 which is situated within a cylinder 53, and which is in engagement with a spring 54.

The extent of the feed movement of the piston 46 must correspond exactly to the angle to which the table 50 is rotated, which in this example is assumed to be 60°. An adjustable abutment 55 is used to regulate the extent of the feed movement of the piston 46.

The cylinder 45 is also connected with the pipe 57, having a branch pipe which is in communication with a throttle valve 58. The throttle valve is connected with a pipe leading back to the cylinder 45. Other branch pipes connected with the pipe 57 contain spring actuated valves 65, 64 and 57a. The valve 65 is connected with the pipe which leads back to the cylinder 45. The valves 64 and 57a are connected with a pipe 59.

The movements of the piston rod 46a are also used to actuate an electrical switch 56, which may cause the flow of electrical current through the conduit 60 which leads to the magnetic relay 61. When the relay 61 is energized, it attracts a movable switch which causes the flow of electrical current through the wires 61a leading to the magnet 34 of the valve 33.

The pump 32 is provided with a pipe 32a leading to the valve 33. The pipe 62 leads from the middle portion of the valve 33 to the cylinder 42. The pipe 62 is connected to a pipe 66 leading to a cylinder 67a which contains a piston 67 engaged by a spring 67b.

The pressure of the spring 67b is so selected that the piston 67 frees the opening of the pipe 68 at a predetermined pressure of the fluid within the pipe 66.

The cylinder 67a is also provided with a passage 69 leading to a chamber which is in communication with five pipes 70 to 74. These pipes lead to the five steering valves 3, one of which is shown in the drawing.

The operation of the device is as follows:

The abutment 9 is brought into engagement with the rod 12a of the valve 12, just prior to the beginning of the work movement of the tool holder 6a. At that time, the tool holder 6a is moving downward and the disc 8 is moving in a direction opposite to that of the arrow $m$.

Up to that moment, the valve body of the controlling valve 3 occupied its lowermost position and, therefore, the two pumps 1 and 2 supply fluid under pressure to the piston 5 and accelerated its downward movement.

At the beginning of the work movement, the conduit 13a is closed to the supply of the operating fluid by the valve 12, so that now only the pump 1 supplies fluid under pressure to the upper end of the cylinder 4. The extent of speed of the work movement can be conveniently changed by adjusting the pump 1 which can be regulated continuously.

The work movement is ended by the adjustable abutment 14 which terminates the downward movement of the tool holder 6a. As soon as the tool holder 6a strikes the abutment 14, pressure is increased in the fluid transmitting conduit of the pump 1 and then the piston 15a of the valve 15 is moved upwardly compressing the spring 15b.

The piston 15a frees the opening of the pipe 16 and the valve body of the valve 3 is then brought into the position shown in the drawing, by the fluid flowing through the pipe 16.

In the illustrated position, the conduit 16a is connected with the fluid container 22, and only the pump 2 now transmits fluid under pressure through the pipe 13, the casing of the valve 3 and the pipe 13b into the cylinder 4, thereby moving the piston 5 as well as the rack 7, the tool holder 6a and the tool 6 upwardly into their end position.

By adjusting the abutment 14, the length of the work movement of the tool 6 can be set in conformity with the dimensions of the workpiece.

While the tool holder 6a moves upwardly, the disc 8 is rotated in the direction of the arrow $m$ due to its connection with the gear wheel 8a meshing with the rack 7.

In the upper end position of the tool holder 6a, the abutment 10 engages the switch 23. Other switches 24 to 27 are actuated in a similar manner. When all of these switches are closed and the switch or contact 29 is situated in the illustrated position, the relay 30 is energized, a current flows through the wires 30a and the motor 31 is actuated. The motor 31 will actuate the pump 32 which will cause a turning of the table 50 in a manner to be described hereinafter.

The valve body 33 is situated in the illustrated position at the beginning of the turning movement of the table 50, as a result of the action of the switching means. In this position, the fluid conducting pipe 32a of the pump 32 is connected by the pipe 36 with the cylinder 37, so that the fluid exerts pressure upon one side of the piston 38.

The fluid moves the piston 38 into its uppermost position which is illustrated in the drawing. This actuates the movable member 39 of the coupling which actuates a drive rotating the work pieces.

The member 39 also actuates the brake 40 which stops immediately the operation of the drive turning the work pieces.

As soon as the piston 38 has reached its uppermost position, it frees the conduit 41 so that fluid under pressure can flow to the cylinder 42.

This fluid will move the piston 43 upwardly thereby causing a rotation of the gear wheel of the crank drive 44a and moving the bolt 44 of the locking device to free the table 50.

When the piston 43 has reached its end position, fluid under pressure will flow through the pipes 42a and 41 to the cylinder 45 and will move the piston 46 within that cylinder in the direction of the arrow $n$. The coupling 51 is in its operative position at that time, so that the table 50 will be rotated by the rack 57, the shaft 48 and the gear wheel 49.

In the course of this movement of the piston 46, it closes the opening of the conduit 57 and drives the fluid through the adjustable valve 58 and the pipe 59. The braking action which is thus created, prevents the piston 46 from striking the abutment 55 with great force and also destroys the impetus of the heavy table 50.

At the time when the piston rod 46a strikes the abutment 55, the electrical switch 56 is closed so that an electric current will flow through the wires 60. This will operate the relay 61 which closes the switch connected with the wires 61a. The wires 61a will be energized and will supply electrical current to the electromagnet 34 of the valve 33. The magnet 34 will attract the valve body of the valve 33, which will then move into its uppermost position.

In the uppermost position of the valve body, the fluid conducting pipe 32a of the pump 32 is connected with a pipe 62 leading to the cylinder 42. The fluid will actuate the piston 43 which will cause the bolt 44 of the locking device to move into a bore hole provided in the rotary table 50, thereby locking the table.

In the course of this downward movement of the piston 43, the latter frees the opening of the pipe 63, so that fluid under pressure can be supplied to the pipe 59.

However, the spring actuated valve 64 is situated between the pipe 59 and the cylinder 45.

At the same time, fluid under pressure flows through the pipe 59a into the upper end of the cylinder 53.

The spring 54 has been selected weaker than the spring of the valve 64 so that the pressure of the fluid causes the piston 52 to move downwardly.

This causes the coupling 51 to be switched off, so that the drive of the table 50 is now disconnected.

In the meantime, the pump 32 continues to pump the fluid so that the pressure of the latter is gradually increased. This increased pressure will finally overcome the action of the spring of the valve 64, so that the valve 64 will be opened and the fluid will flow through the valve 65 into the cylinder 45. Then, the piston 46 will be moved back into its original position.

When the piston 46 has terminated its return movement, fluid under pressure will flow through the pipe 66 to the cylinder 67a.

The pressure of the fluid will be further increased due to the continuous action of the pump 32.

The fluid flowing into the cylinder 67a will move its piston 67 upwardly and will compress the spring 67b. As already stated, the strength of the spring 67b is so selected that when a predetermined pressure is reached, the opening of the pipe 68 is freed and then the fluid can flow to the cylinder 37. The piston 38 is then moved downwardly and the brake 40 is moved into its operative position.

At the same time, the coupling 39 engages the drive for the work pieces, so that this drive is now operated.

After the piston 37 has been moved into its end position, pressure in the cylinder 67a will increase still further and the piston 67 will be moved still further upwardly so that the piston 67 will free the passage 69. Then fluid under pressure will be able to flow through the five pipes 70 to 74, inclusive, to the steering valves 3 of the tool drive.

The valve body of the valve 3 will then move downwardly from the illustrated position, and the space above the piston 5 in the cylinder 4 will be connected with the pumps 1 and 2, while the space below the piston 5 will be connected at the same time only with the pump 2. The downward movement of the tool holder 6a can begin now and the described mode of operation will be repeated.

When the downward movement of the valve bodies of all the valves 3 is completed, the pump 32 which still continues its operation, will cause a further increase in pressure of the fluid in the pipe 66 and the cylinder 67a.

The piston 67 will then move still further and will operate the switch 29.

In the meantime, the electrical switches 23 to 27 have been actuated by the rotation of the disc 8 in a direction opposite to that of the arrow m, so that these switches have energized the conduit 78. Then, an electrical current will flow through the wire 75 and the switch 29, so that the relay 76 will be actuated.

The electrical current will excite the electromagnet 35 which will move the pistons of the valve 33 back into their original illustrated position. The valve 33 will then be ready for a repetition of the described mode of operation.

At the same time, the energization of the relay 76 will interrupt the flow of the electrical current through the wire 77 leading to the relay 30. The relay 30 will be de-energized and the flow of electrical current to the motor 31 will be interrupted, so that the motor 31 and the pump 32 will be stopped.

It is apparent that the specific illustrations shown and described above have been given by way of illustration and not by way of limitation and that the structure above described is subject to wide variation and modification without departing from the scope and intent of the invention, all of which variations and modifications are to be included within the scope of the present invention.

What is claimed is:

1. In a tool machine, in combination, a plurality of tool holders, pressure operated means connected with said tool holders to move them individually toward a work piece and away from said work piece to cause tools carried by the tool holders to operate upon the work piece, means connected with said holder-moving means for supplying fluid under pressure thereto, a rotary work piece-supporting table, pressure operated means connected with said table for turning it stepwise to move the work piece carried by the table from one tool holder to an adjacent tool holder, means connected with said table-turning means for supplying a fluid under pressure to said table turning means, electrically operated means connected with said holder-moving means and said table-turning means to regulate the movements of said tool holders and of said table in dependency one from the other, and electrical switches connected with said electrically operated regulating means for actuating the same.

2. In a tool machine, in combination, a plurality of tool holders, a separate cylinder for each tool holder, a separate piston within each cylinder, separate means operatively connecting each piston within its tool holder, means connected with the cylinders for supplying fluid under pressure thereto to actuate said pistons and move said tool holders individually toward and away from a work piece, whereby tools carried by the tool holders are caused to operate upon the work piece, electrical switching means actuated by said piston and holder connecting means, a rotary work piece supporting table, pressure operated means connected with said table for turning it stepwise to move the work piece carried by the table from one tool holder to an adjacent tool holder, electrically operated means connected with said table-turning means for supplying a fluid under pressure to said table turning means, and electricity-conducting means operatively connecting said electrical switching means with the means which supply fluid to the table turning means.

3. In a tool machine, in combination, a plurality of tool holders, pressure operated means connected with said tool holders to move them individually toward a work piece to cause the tools carried by the tool holders to operate upon a work piece and to cause a return movement of the tool holders away from the work piece, a plurality of electrical switching devices, the number of said switching devices being equal to that of said tool holders, separate means connected with each switching device and individually engaging the pressure operated holder-moving means to actuate a switching device when a tool holder has completed its return movement, electricity-conducting means interconnecting said switching devices in series, a rotary work piece-supporting table, pressure operated means connected with said table for turning it stepwise to move the work piece carried by the table from one tool holder to an adjacent tool holder, electrically operated means connected with said table-turning means for supplying a fluid under pressure to said table-turning means, and electricity-conducting means operatively connecting the first-mentioned electricity-conducting means with the means which supply fluid to the table turning means, whereby the table turning means are actuated after the actuation of the switching devices and upon the completion of the return movement of all of the tool holders.

4. In a tool machine, a tool holder, a cylinder, a piston reciprocable within said cylinder, means operatively connecting said piston to the said tool holder to cause the tool holder to carry out a forward movement, a work movement and a return movement, two fluid-transmitting pumps, a controlling valve, a pipe connecting said controlling valve with one end of said cylinder, another pipe connecting said controlling valve with the other end of said cylinder, a pipe connecting one of said pumps with said controlling valve, a pipe connecting the other one of said pumps with said controlling valve, a spring-actuated valve, a pipe connecting the other one of said pumps with said spring-actuated valve, a pipe connecting said spring-actuated valve with said controlling valve, another controlling valve, a pipe connecting the first-mentioned controlling valve with said other controlling valve, a pipe connecting said cylinder with said other controlling valve, and means connected with said other controlling valve and engaging the means which connect the piston and the holder to actuate said other controlling valve, whereby different amounts of fluid under different pressures are supplied to said cylinder, and said tool holder is moved with different speeds during said forward movement, said work movement and said return movement.

5. In a tool machine, a rotary work piece-supporting table, pressure operated means connected with said table for turning the same, a source of fluid under pressure, a controlling valve, electrical means connected with said controlling valve for operating the same, means connected with said source and said controlling valve for transmitting fluid under pressure from said source to said controlling valve, means connected with said pressure-operated table-turning means and said controlling valve for transmitting said fluid to said pressure-operated table-turning means to actuate the same, electrical switching means actuated by the pressure-operated table-turning means, and electricity-conducting means electrically operatively connecting the valve-operating electrical means with said electrical switching means, whereby the operation of the controlling valve is dependent upon the movements of said rotary table.

6. In a tool machine, a rotary work piece-supporting table, pressure operated means connected with said table for turning the same, a source of fluid under pressure, a controlling valve, means connected with said controlling valve for operating the same, means connected with said source and said controlling valve for transmitting fluid under pressure from said source to said controlling valve, means connected with said pressure-operated table-turning means and said controlling valve for transmitting said fluid to said pressure-operated table-turning means to actuate the same, means for turning a work piece, locking means for locking and releasing said table, a pressure-operated drive connected with said work piece-turning means for actuating the same, another pressure-operated drive connected with said locking means for actuating the same, and means connecting the first-mentioned drive with said source, said table-turning means and said controlling valve and connecting the second-mentioned drive with said controlling valve and the first-mentioned drive to cause the fluid to actuate the two drives, to stop the turning of the work piece and release said table.

7. In a tool machine, a rotary work piece-supporting table, pressure operated means connected with said table for turning the same, a source of fluid under pressure, a controlling valve, means connected with said controlling valve for operating the same, means connected with said source and said controlling valve for transmitting fluid under pressure from said source to said controlling valve, means connected with said pressure-operated table-turning means and said controlling valve for transmitting said fluid to said pressure-operated table-turning means to actuate the same, means for turning a work piece, a brake for stopping the turning of the work piece, locking means for locking and releasing said table, a pressure-operated drive connected with said work piece-turning means and said brake for actuating them, another pressure-operated drive connected with said locking means for actuating the same, and means connecting the first-mentioned drive with said source, said table-turning means and said controlling valve and connecting the second-mentioned drive with said controlling valve and the first-mentioned drive to cause the fluid to actuate the two drives, to stop the turning of the work piece while applying said brake and to release said table.

8. In a tool machine, a rotary work piece supporting table, pressure operated means connected with said table for turning the same, a source of fluid under pressure, a controlling valve, means connected with said controlling valve for operating the same, means connected with said source and said controlling valve for transmitting fluid under pressure from said source to said controlling valve, means for turning a work piece, locking means for locking and releasing said table, a pressure-operated drive connected with said workpiece-turning means for actuating the same, another pressure-operated drive connected with said locking means for actuating the same, fluid-transmitting means interconnecting the two drives in series, means connected with said fluid-transmitting means and said pressure-operated table-turning means for transmitting the fluid to said pressure-operated table-turning means to actuate the same, and means connected with said fluid-transmitting means and said controlling valve to cause a work piece to stop and the locking means to unlock said table before said table is turned by said table-turning means.

9. In a tool machine, a rotary work piece-supporting table, a cylinder, a piston reciprocable within said cylinder, means connected with said piston and said table for turning the table and including a coupling; a source of fluid under pressure, a controlling valve, electrical means connected with said controlling valve for operating the same, means connected with said source and said controlling valve for transmitting fluid under pressure from said source to said controlling valve, means connected with said cylinder and said controlling valve for transmitting said fluid to said cylinder to actuate said piston, fluid-actuated means connected with said coupling and said cylinder for disengaging said coupling at the end of the turning movement of said table, a switch, means connected with the table-turning means and actuated by a movement of said piston to actuate said switch, and electricity-conducting means connected with said switch and said electrical valve-operating means to move said controlling valve to a different position when said switch is actuated.

10. In a tool machine, a rotary work piece supporting table, a cylinder, a piston reciprocable within said cylinder, means connected with said piston and said table for turning the table, a source of fluid under pressure, means connected with said source and said cylinder for supplying said fluid to said cylinder to actuate said piston and thereby turn the table to a predetermined extent, and fluid-removing means connected with said cylinder and including throttling means operable close to the end of the movement of said table to cause said fluid to exert a braking action upon said piston.

11. In a tool machine, in combination, a tool holder, pressure-operated means connected with said tool holder for moving it toward and away from a work piece and causing a tool carried by the tool holder to operate upon the work piece, a rotary work piece-supporting table, pressure operated means connected with said table for turning the same to a predetermined extent, a source of fluid under pressure, a controlling valve, means connected with said controlling valve for operating the same, means connected with said source and said controlling valve for transmitting fluid under pressure from said source to said controlling valve, fluid transmitting means connecting said source with said holder-moving means, a plurality of devices operated by a fluid under different pressures and operative at the end of the turning movement of said table, and fluid-transmitting means connecting said controlling valve with said table-turning means and also connected with the first-mentioned fluid-transmitting means and said fluid-operated devices, the last-mentioned fluid-transmitting means including loaded valves consituting a plurality of resistances to the flow of the fluid, said valves increasing in several stages the pressure of the fluid at a predetermined position of said controlling vlave to operate said fluid-operated devices and influence the movement of the tool holder one after the other.

12. In a tool machine, in combination, a tool holder, pressure-operated means connected with said tool holder for moving it toward and away from a work piece and causing a tool carried by the tool holder to operate upon the work piece, a rotary work piece-supporting table, pressure operated means connected with said table for turning the same and including a coupling, fluid-operated means for locking said table, fluid-operated means connected with said table-turning means for moving the latter to an inoperative position, fluid-operated means for turning a work piece, a source of fluid under pressure, and means connecting said source with said table-turning means to transmit the fluid to said table-turning means, the last-mentioned means being also connected to said locking means, said coupling, said means for moving the table-turning means, said means for turning a work piece and said holder-moving means to operate them one after the other.

13. In a tool machine, in combination, a plurality of tool holders, separate pressure actuated means connected with each tool holder to move it toward a work piece, to cause the tool carried by said tool holder to operate upon a work piece and to cause a return movement of the tool holder, a single valve connected with all of said pressure-operated holder-moving means, a pump for pumping fluid under pressure, an electro-motor connected with said pump for driving the same, an electrically operated controlling valve, a rotary work piece-supporting table, fluid operated means connected with said table for rotating the same, fluid-transmitting means connecting said table-rotating means with said controlling valve, fluid-transmitting means connecting said pump with said controlling valve, fluid-transmitting means connecting said pump with said single valve, electrical means operatively connected with said controlling valve and actuated by said single valve at an increased fluid pressure to change the position of said controlling valve, and means connected with said electrical means and said electro-motor to stop said electro-motor at said increased fluid-pressure.

EWALD DORNHÖFER.
ROBERT OBTRESAL.